(12) United States Patent
Compton et al.

(10) Patent No.: US 7,999,870 B2
(45) Date of Patent: Aug. 16, 2011

(54) SAMPLING AND READOUT OF AN IMAGE SENSOR HAVING A SPARSE COLOR FILTER ARRAY PATTERN

(75) Inventors: John T. Compton, LeRoy, NY (US); John F. Hamilton, Jr., Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 773 days.

(21) Appl. No.: 12/024,743

(22) Filed: Feb. 1, 2008

(65) Prior Publication Data
US 2009/0195681 A1    Aug. 6, 2009

(51) Int. Cl.
H04N 3/14    (2006.01)
H04N 5/335    (2006.01)
H04N 9/04    (2006.01)

(52) U.S. Cl. .......................... 348/308; 348/273; 348/277
(58) Field of Classification Search .......... 348/266–293, 348/294–324
See application file for complete search history.

(56) References Cited

U.S. PATENT DOCUMENTS

| | | | |
|---|---|---|---|
| 3,971,065 A | 7/1976 | Bayer et al. | |
| 5,652,621 A | 7/1997 | Adams, Jr. et al. | |
| 5,670,817 A | 9/1997 | Robinson | |
| 6,714,243 B1* | 3/2004 | Mathur et al. | 348/273 |
| 6,734,906 B1 | 5/2004 | Hashimoto | |
| 6,809,008 B1 | 10/2004 | Holm et al. | |
| 6,927,432 B2 | 8/2005 | Holm et al. | |
| 6,984,816 B2 | 1/2006 | Holm et al. | |
| 7,724,292 B2* | 5/2010 | Ueno et al. | 348/273 |
| 7,821,553 B2* | 10/2010 | Ellis-Monaghan et al. | 348/277 |
| 7,839,437 B2* | 11/2010 | Kasai et al. | 348/238 |
| 7,916,362 B2* | 3/2011 | Kijima et al. | 358/500 |
| 2006/0007337 A1 | 1/2006 | Panicacci | |
| 2007/0024879 A1 | 2/2007 | Hamilton, Jr. et al. | |
| 2007/0024931 A1 | 2/2007 | Compton et al. | |
| 2007/0030366 A1 | 2/2007 | Compton | |
| 2007/0046807 A1 | 3/2007 | Hamilton, Jr. et al. | |
| 2007/0069258 A1 | 3/2007 | Ahn | |
| 2007/0177236 A1 | 8/2007 | Kijima et al. | |
| 2007/0268533 A1 | 11/2007 | Kijima et al. | |
| 2007/0285548 A1 | 12/2007 | Gomi | |

FOREIGN PATENT DOCUMENTS

| | | |
|---|---|---|
| EP | 0 954 032 | 11/1999 |
| WO | WO 2006/130518 | 12/2006 |
| WO | WO 2007/015765 | 2/2007 |

* cited by examiner

*Primary Examiner* — Jason Chan
*Assistant Examiner* — Pritham Prabhakher
(74) *Attorney, Agent, or Firm* — Blakely Sokoloff Taylor & Zafman LLP

(57) ABSTRACT

A CMOS image sensor or other type of image sensor comprises an array of pixels arranged in rows and columns, with the columns being separated into groups each comprising two or more columns that share a common output. The image sensor further comprises sampling and readout circuitry that includes, for each group of columns in the pixel array, a corresponding set of two or more column circuits. The sampling and readout circuitry is configured to sample the common output for each group of columns independently into one of the column circuits associated with that group, and to read out the common output for each group of columns as previously sampled into another of the column circuits associated with that group. The image sensor may be implemented in a digital camera or other type of image capture device.

16 Claims, 16 Drawing Sheets

SAMPLING AND READOUT OF AN IMAGE SENSOR HAVING A SPARSE COLOR FILTER ARRAY PATTERN

FIELD OF THE INVENTION

The present invention relates generally to electronic image sensors for use in digital cameras and other image capture devices, and more particularly to sampling and readout techniques for use with an electronic image sensor.

BACKGROUND OF THE INVENTION

A typical electronic image sensor comprises a number of light sensitive picture elements ("pixels") arranged in a two-dimensional array. Such an image sensor may be configured to produce a color image by forming a color filter array (CFA) over the pixels. One commonly used type of CFA pattern is the Bayer pattern, disclosed in U.S. Pat. No. 3,971,065, entitled "Color Imaging Array," which is incorporated by reference herein. The Bayer CFA pattern provides each pixel with color photoresponse exhibiting a predominant sensitivity to one of three designated portions of the visible spectrum. The three designated portions may be, for example, red, green and blue, or cyan, magenta and yellow. A given CFA pattern is generally characterized by a minimal repeating unit in the form of a subarray of contiguous pixels that acts as a basic building block for the pattern. Multiple copies of the minimal repeating unit are juxtaposed to form the complete pattern.

An image captured using an image sensor with a Bayer CFA pattern has only one color value at each pixel. Therefore, in order to produce a full color image, the missing color values at each pixel are interpolated from the color values of nearby pixels. Numerous such interpolation techniques are known in the art. See, for example, U.S. Pat. No. 5,652,621, entitled "Adaptive Color Plane Interpolation in Single Sensor Color Electronic Camera," which is incorporated by reference herein.

In accordance with conventional practice, sampling and readout of the pixels of an image sensor having a Bayer CFA pattern will generally sample all the pixels in a given row into column circuits, and then the entire row of pixels would be read from the column circuits in a single operation. The sampling and readout proceeds in this manner in order to preserve the pixel order of the Bayer CFA pattern in the readout data.

U.S. Patent Application Publication No. 2007/0024931, entitled "Image Sensor with Improved Light Sensitivity," which is incorporated by reference herein, discloses improved CFA patterns, including patterns which provide certain of the pixels with a panchromatic photoresponse. Such patterns are also generally referred to herein as "sparse" CFA patterns. A panchromatic photoresponse has a wider spectral sensitivity than those spectral sensitivities represented in the selected set of color photoresponses and may, for example, have high sensitivity across substantially the entire visible spectrum. Image sensors configured with the improved CFA patterns exhibit greater light sensitivity and are thus well-suited for use in applications involving low scene lighting, short exposure time, small aperture, or other restrictions on the amount of light reaching the image sensor.

Conventional sampling and readout techniques such as those described above in the context of the Bayer CFA pattern can be inefficient when applied to sparse CFA patterns.

Accordingly, a need exists for improved sampling and readout techniques for use with sparse CFA patterns.

SUMMARY OF THE INVENTION

Illustrative embodiments of the invention provide sampling and readout techniques that are particularly well-suited for use with image sensors having sparse CFA patterns.

In accordance with one aspect of the invention, an image sensor comprises an array of pixels arranged in rows and columns, with the columns being separated into groups each comprising two or more columns that share a common output. The image sensor further comprises sampling and readout circuitry that includes, for each group of columns in the pixel array, a corresponding set of two or more column circuits. The sampling and readout circuitry is configured to sample the common output for each group of columns independently into one of the column circuits associated with that group, and to read out the common output for each group of columns as previously sampled into another of the column circuits associated with that group.

By way of example, the sampling and readout circuitry may be configured to sample the common output for a given one of the groups of columns into one of the plurality of column circuits associated with the given group concurrently with reading out of the common output for the given group as previously sampled into another of the plurality of column circuits associated with the given group.

In one of the illustrative embodiments, the pixel array of the image sensor is configured in accordance with sparse CFA pattern color having a minimal repeating unit including a plurality of cells, each including a plurality of same-color pixels and a plurality of panchromatic pixels. For example, each of the cells may comprise four pixels with two same-color pixels arranged diagonally relative to one another and two panchromatic pixels arranged diagonally relative to one another. The sampling and readout circuitry may be configured in an embodiment of this type such that the color pixels in a given one of the cells are sampled and read out using different column circuits than the panchromatic pixels in the given cell.

An image sensor in accordance with the invention may be advantageously implemented in a digital camera or other type of image capture device, and considerably facilitates image generation and associated processing operations in a wide variety of different operating modes. The operating modes may include, for example, full resolution modes with or without color binning, quarter-resolution modes with panchromatic binning and color binning, double sampling modes, video modes, fast autofocus modes, etc.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present invention will be illustrated herein in conjunction with particular embodiments of image capture devices, image sensors, and associated sampling and readout techniques. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of image capture devices, image sensors, and associated sampling and readout techniques.

Figure 1:
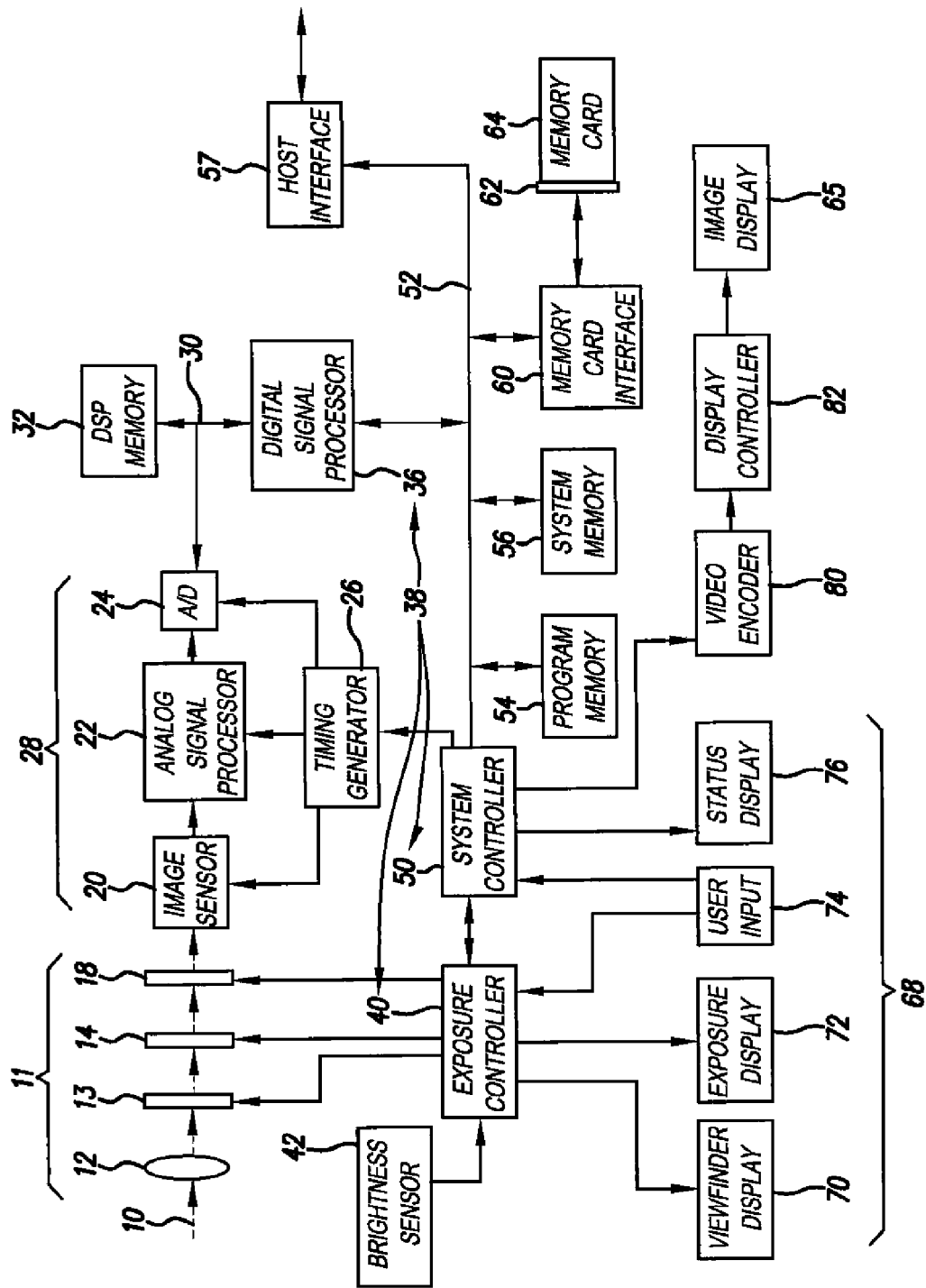
FIG. 1 is a block diagram of a digital camera having an image sensor with a sparse CFA pattern and incorporating sampling and readout circuitry in accordance with an illustrative embodiment of the invention.

FIG. 1 shows a digital camera in which sampling and readout techniques are implemented in an illustrative embodiment of the invention. In the digital camera, light 10 from a subject scene is input to an imaging stage 11. The imaging stage 11 comprises lens 12, neutral density (ND) filter 13, iris 14 and shutter 18. The light 10 is focused by lens 12 to form an image on an image sensor 20. The amount of light reaching the image sensor 20 is regulated by iris 14, ND filter 13 and the time that shutter 18 is open. Image sensor 20 converts the incident light to an electrical signal for each pixel. The image sensor 20 may be, for example, a charge coupled device (CCD) type or active pixel sensor (APS) type image sensor, although other types of image sensors may be used in implementing the invention. APS type image sensors fabricated using a complementary metal-oxide-semiconductor (CMOS) process are often referred to as CMOS image sensors. The image sensor 20 generally has a two-dimensional array of color and panchromatic pixels configured in accordance with a sparse CFA pattern. Examples of sparse CFA patterns that may be used with the image sensor 20 include those described in the above-cited U.S. Patent Application Publication No. 2007/0024931, although other CFA patterns may be used in other embodiments of the invention.

An analog signal from image sensor 20 is processed by analog signal processor 22 and applied to analog to digital (A/D) converter 24. Timing generator 26 produces various clocking signals to select particular rows and columns of the pixel array for processing, and synchronizes the operation of analog signal processor 22 and A/D converter 24. The image sensor 20, analog signal processor 22, A/D converter 24, and timing generator 26 collectively form an image sensor stage 28 of the digital camera. The components of image sensor stage 28 may comprise separately fabricated integrated circuits, or they may be fabricated as a single integrated circuit as is commonly done with CMOS image sensors. The A/D converter 24 outputs a stream of digital pixel values that are supplied via a bus 30 to a memory 32 associated with a digital signal processor (DSP) 36. Memory 32 may comprise any type of memory, such as, for example, synchronous dynamic random access memory (SDRAM). The bus 30 provides a pathway for address and data signals and connects DSP 36 to memory 32 and A/D converter 24.

The DSP 36 is one of a plurality of processing elements of the digital camera that are indicated as collectively comprising a processing stage 38. The other processing elements of the processing stage 38 include exposure controller 40 and system controller 50. Although this partitioning of digital camera functional control among multiple processing elements is typical, these elements may be combined in various ways without affecting the functional operation of the camera and the application of the present invention. A given one of the processing elements of processing stage 38 can comprise one or more DSP devices, microcontrollers, programmable logic devices, or other digital logic circuits. Although a combination of three separate processing elements is shown in the figure, alternative embodiments may combine the functionality of two or more of these elements into a single processor, controller or other processing element. Sampling and readout techniques as described herein may be implemented at least in part in the form of software that is executed by one or more such processing elements.

The exposure controller 40 is responsive to an indication of an amount of light available in the scene, as determined by brightness sensor 42, and provides appropriate control signals to the ND filter 13, iris 14 and shutter 18 of the imaging stage 11.

The system controller 50 is coupled via a bus 52 to DSP 36 and to program memory 54, system memory 56, host interface 57 and memory card interface 60. The system controller 50 controls the overall operation of the digital camera based on one or more software programs stored in program memory 54, which may comprise Flash electrically erasable programmable read-only memory (EEPROM) or other nonvolatile memory. This memory is also used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data.

In the illustrated embodiment, DSP 36 manipulates the digital image data in its memory 32 according to one or more software programs stored in program memory 54 and copied to memory 32 for execution during image capture. After an image is captured and processed, the resulting image file stored in memory 32 may be, for example, transferred via host interface 57 to an external host computer, transferred via memory card interface 60 and memory card socket 62 to removable memory card 64, or displayed for the user on an image display 65. The image display 65 is typically an active matrix color liquid crystal display (LCD), although other types of displays may be used.

The digital camera further comprises a user control and status interface 68 including a viewfinder display 70, an exposure display 72, user inputs 74 and status display 76. These elements may be controlled by a combination of software programs executed on exposure controller 40 and system controller 50. The user inputs 74 typically include some combination of buttons, rocker switches, joysticks, rotary dials or touchscreens. Exposure controller 40 operates light metering, exposure mode, autofocus and other exposure functions. The system controller 50 manages a graphical user interface (GUI) presented on one or more of the displays, e.g., on image display 65. The GUI typically includes menus for making various option selections and review modes for examining captured images.

Processed images may be copied to a display buffer in system memory 56 and continuously read out via video encoder 80 to produce a video signal. This signal may be output directly from the camera for display on an external monitor, or processed by display controller 82 and presented on image display 65.

It is to be appreciated that the digital camera as shown in FIG. 1 may comprise additional or alternative elements of a type known to those skilled in the art. Elements not specifically shown or described herein may be selected from those known in the art. As noted previously, the present invention may be implemented in a wide variety of other types of digital cameras or image capture devices. For example, the present invention can be implemented in imaging applications involving mobile phones and automotive vehicles. Also, as mentioned above, certain aspects of the embodiments described herein may be implemented at least in part in the form of software executed by one or more processing elements of an image capture device. Such software can be implemented in a straightforward manner given the teachings provided herein, as will be appreciated by those skilled in the art.

The image sensor 20 shown in FIG. 1 includes a two-dimensional array of light sensitive pixels fabricated on a silicon substrate that provide a way of converting incoming light at each pixel into an electrical signal that is measured. As the sensor is exposed to light, free electrons are generated and captured within the electronic structure at each pixel. Capturing these free electrons for some period of time and then measuring the number of electrons captured, or measuring the rate at which free electrons are generated, allows the light level at each pixel to be measured. In the former case, accumulated charge is shifted out of the array of pixels to a charge to voltage measurement circuit as in a CCD type image sensor, or the area close to each pixel contains elements of a charge to voltage measurement circuit as in an APS type or CMOS image sensor.

Whenever general reference is made to an image sensor in the following description, it is understood to be representative of the image sensor 20 from FIG. 1. It is further understood that all examples and their equivalents of image sensor architectures and pixel patterns of the present invention disclosed in this specification are used for image sensor 20.

In the context of an image sensor, a pixel refers to a discrete light sensing area and charge shifting or charge measurement circuitry associated with the light sensing area. In the context of a digital color image, the term pixel commonly refers to a particular location in the image having associated color values.

Figure 2:
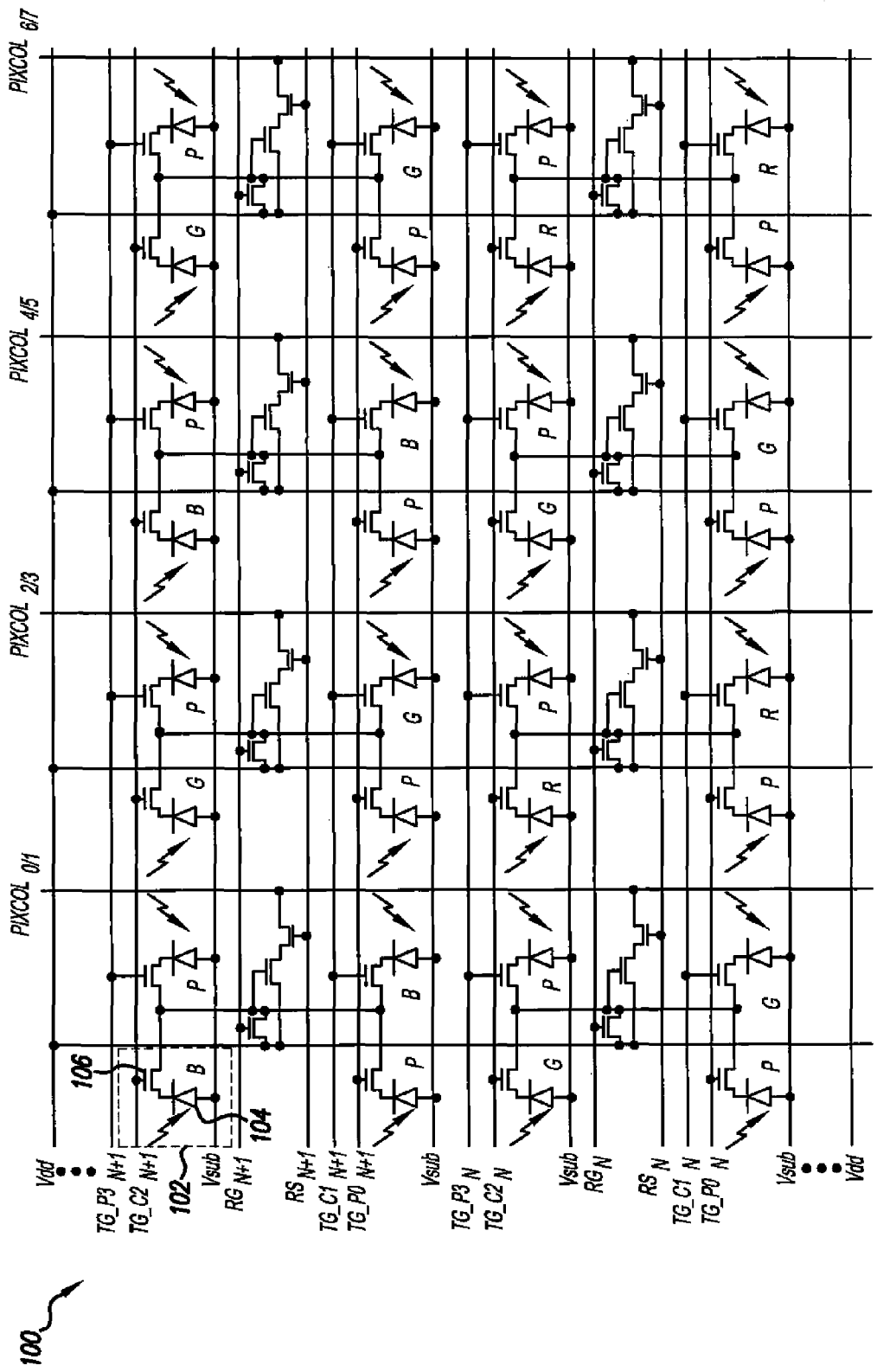
FIG. 2 is a schematic diagram of one possible implementation of a portion of a pixel array in the image sensor of the digital camera of FIG. 1.

FIG. 2 shows a portion of a pixel array 100 in the image sensor 20 of the digital camera of FIG. 1 in an illustrative embodiment. Each pixel 102 of the pixel array 100 comprises a photodiode 104 and a transfer gate (TG) 106. Additional circuitry 108 comprising multiple transistors is shared by a subarray of four pixels arranged in a 2×2 block. The 2×2 pixel block is one example of what is more generally referred to herein as a "cell." There is a different set of additional circuitry 108 associated with each of the 2×2 pixel cells. The configuration of pixel array 100 in this embodiment is referred to as a four transistor, four shared (4T4S) arrangement, as four of the pixels and their associated four TGs share the additional circuitry 108. Adjacent each of the pixels 102 in the array 100 is an indicator of the corresponding color, which may be red (R), blue (B), green (G) or panchromatic (P), in accordance with a designated sparse CFA pattern of the image sensor 20. The particular sparse CFA pattern used in the illustrative embodiments described herein is a panchromatic checkerboard pattern disclosed in the above-cited U.S. Patent Application Publication No. 2007/0024931, although numerous other CFA patterns may be used.

The portion of the array 100 shown in FIG. 2 includes four rows of eight pixels each, with the two upper rows of this portion being referred to herein as a blue/green row pair, and the two lower rows being referred to herein as a red/green row pair. The minimal repeating unit in this particular CFA pattern is a subarray of 16 contiguous pixels comprising the left half or right half of the portion of the pixel array 100 as shown in FIG. 2. Thus, the minimal repeating unit comprises 16 pixels arranged in four four-pixel cells as follows:

$$\begin{array}{cccc} Z & P & Y & P \\ P & Z & P & Y \\ Y & P & X & P \\ P & Y & P & X \end{array}$$

where P represents one of the panchromatic pixels and X, Y and Z represent respective color pixels. In this particular embodiment, X, Y and Z are red, green and blue, respectively. Alternatively, X, Y and Z may be individually selected in a different manner from red, green and blue, or may be individually selected from another set of colors, such as cyan, magenta and yellow. Patterns with other minimal repeating units, such as minimal repeating units of at least twelve pixels as described in the above-cited U.S. Patent Application Publication No. 2007/0024931, may be used.

The columns in the portion of the pixel array 100 shown in FIG. 2 are separated into groups, with each group comprising two of the columns and sharing a common output. For example, the pixels in the first two columns at the left side of the array share a common output denoted $PixCol_{0/1}$. Similarly, the pixels in the next two columns of the array share a common output denoted $PixCol_{2/3}$. The remaining two pairs of columns share the respective common outputs denoted $PixCol_{4/5}$ and $PixCol_{6/7}$. Each pixel in a given one of the 2×2 pixel cells is connectable to its shared common output via the additional circuitry 108 associated with that cell. The additional circuitry 108 in this embodiment comprises three N-type metal-oxide-semiconductor (NMOS) transistors interconnected as shown. In other embodiments, different types of column groupings, pixel cells and shared outputs, as well as circuitry for connecting the pixel cells to the shared outputs, may be used.

Elements of the pixel array 100 in FIG. 2 are coupled to supply voltage Vdd and substrate voltage Vsub as shown. Control signals applied to the pixel array include TG control signals TG_P0, TG_C1, TG_C2 and TG_P3, as well as additional control signals including row select (RS) signals and reset gate (RG) signals. The subscripts N+1 and N associated with these signals refer to respective upper and lower row pairs in the array.

As will be described in greater detail below, the pixel array 100 is advantageously configured to permit binning of same-color pixels and binning of panchromatic pixels. The term "binning" as used herein generally refers to simultaneously connecting two or more pixels from the same pixel cell to the same common output prior to sampling that output.

Figure 3:
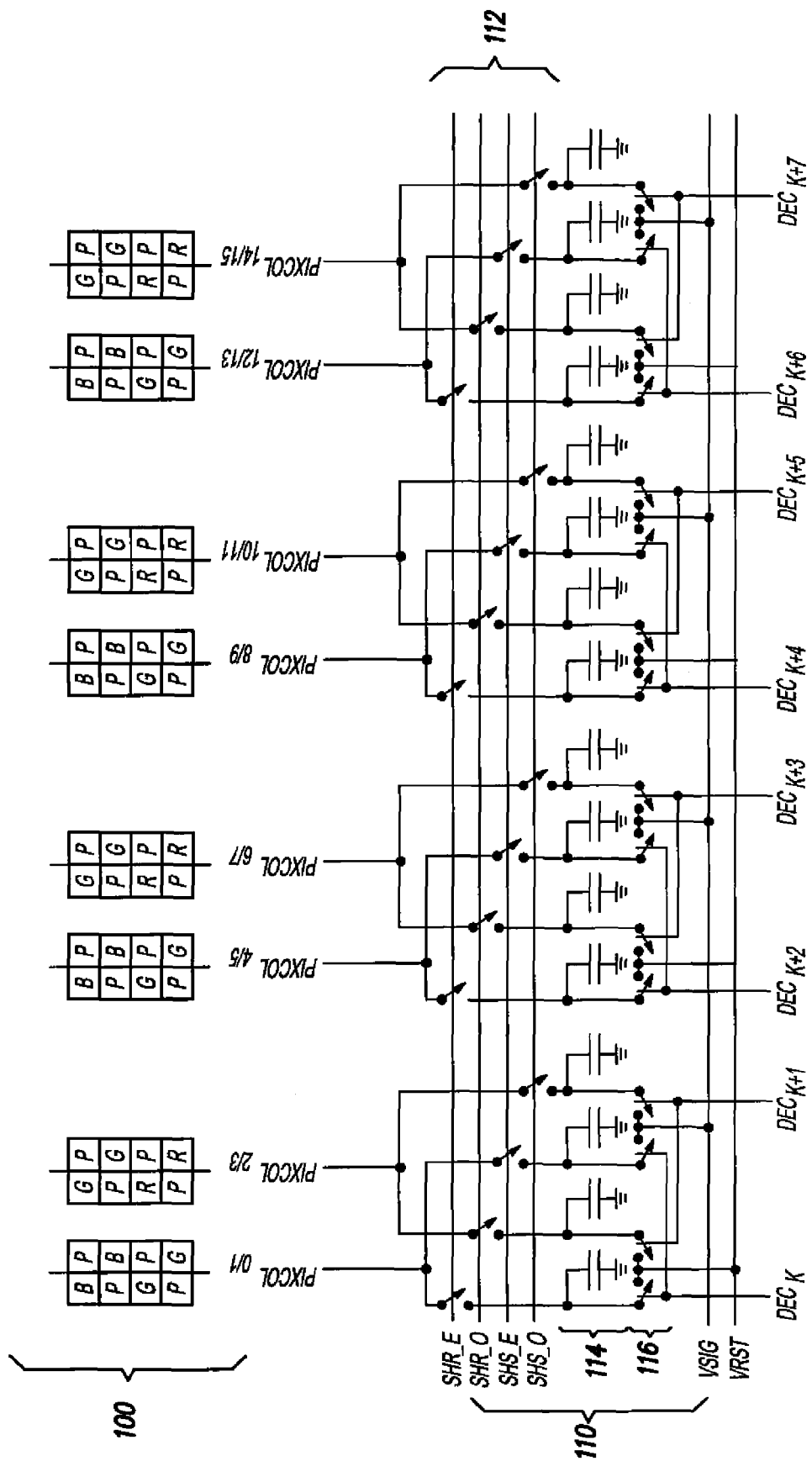
FIG. 3 shows one possible implementation of sampling and readout circuitry comprising column circuits for sampling and readout of the pixel array of FIG. 2.

FIG. 3 illustrates exemplary sampling and readout circuitry comprising column circuits 110 that are configured for sampling and readout of particular column pairs and are located at the bottom of the pixel array 100. In this example, there is one column output for every two columns of pixels. The column circuits 110 comprise sample-and-hold switches 112, column circuit capacitors 114, and column output switches 116. The signals SHx_E and SHx_O that control the switches 112 provide sample-and-hold for even (E) and odd (O) pixel columns, where x=R for reset and x=S for signal. The sampling and readout circuitry in this embodiment further comprises top column circuits, configured in a manner similar to bottom column circuits 110 but not shown in the figure, at the top of the pixel array 100. Top and bottom column circuits configured in the manner illustrated in FIG. 3 will be denoted more specifically herein, for example, in conjunction with FIG. 4, as top and bottom column circuits 110T and 110B, respectively.

The shared common outputs $PixCol_{0/1}$ through $PixCol_{14/15}$ as shown in FIG. 3 are coupled to respective column circuits in the set of column circuits 110. Generally, each such shared common output is coupled to two distinct column circuits in the present embodiment, with one of the column circuits being a top column circuit and another of the column circuits being a bottom column circuit. Thus, in this embodiment, the two column circuits associated with a given group of two columns are on opposite sides of the pixel array 100. Again, only those column circuits at the bottom of the pixel array are shown in FIG. 3. In other embodiments, the two shared column circuits may both be on the same side of the pixel array.

Other signals shown in the FIG. 3 diagram include those denoted voltage output signal (VSIG) and voltage output reset (VRST), as well as decode signals $DEC_K$ through $DEC_{K+7}$, with one of the decode signals associated with each column circuit. Each column circuit in this embodiment comprises a pair of capacitors and the associated switches.

The term "sampling and readout circuitry" as used herein is intended to be construed generally, so as to encompass, for example, not only column circuits such as those shown in FIG. 3, but also other related switching elements associated with the pixel array 100, such as additional circuitry 108. Thus, sampling and readout circuitry in a given embodiment may encompass switches or other elements that are formed integrally with the pixel array. Sampling and readout circuitry is generally implemented within the sensor array 20, for example, as in the case of a CMOS image sensor.

Examples of sampling and readout operations implemented in the illustrative embodiments will now be described in greater detail with reference to the diagrams of FIGS. 4 through 13. Each of the examples shown in FIGS. 4 through 13 utilizes the same four-row portion of pixel array 100 that is shown in FIG. 2. It should be appreciated that a given embodiment of the invention may be configured to support all of the various examples to be described, only a subset of one or more of these examples, or one or more variants thereof. Thus, each of the examples to be described may be viewed as a particular operating mode of a given set of sampling and readout circuitry implemented in the digital camera of FIG. 1.

Figure 4:
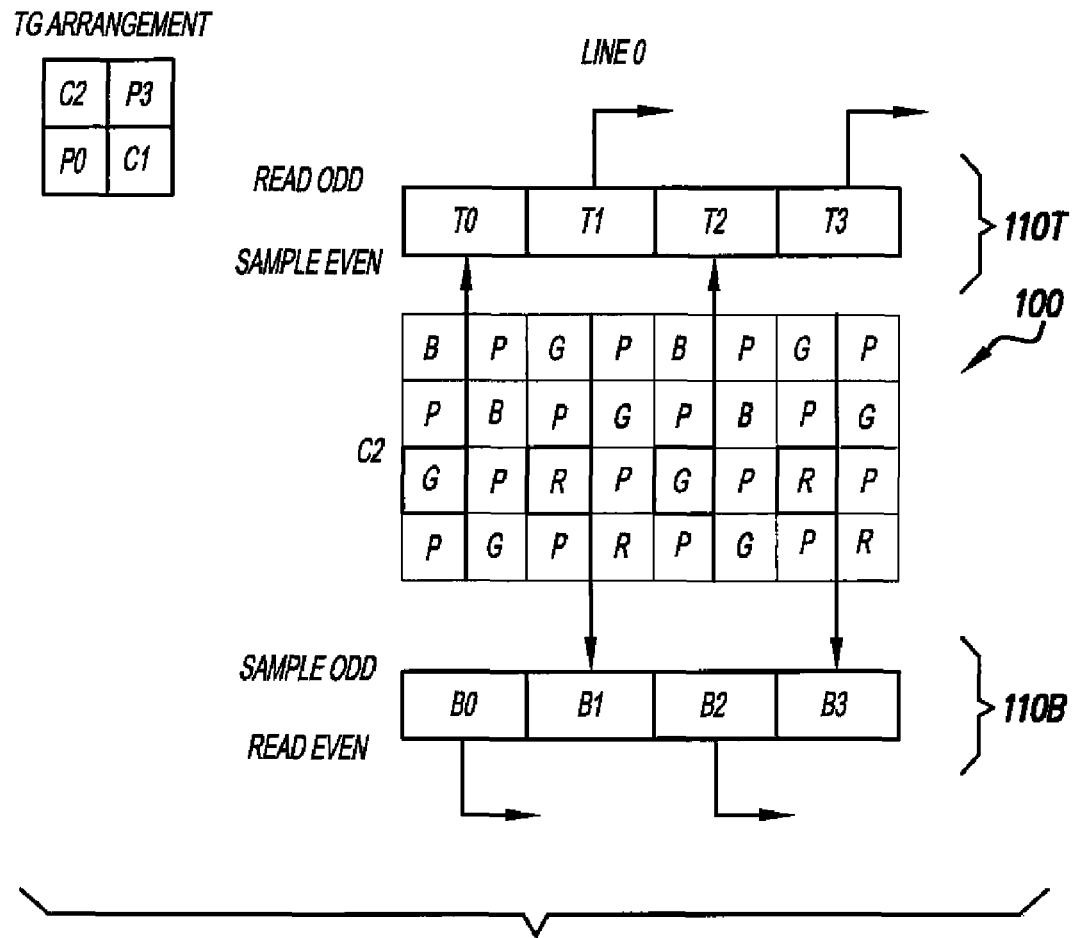
FIGS. 4 through 13 show examples of sampling and readout operations applied to the pixel array of FIG. 2 in illustrative embodiments of the invention.

FIG. 4 generally illustrates the diagrammatical conventions that will be utilized in describing the sampling and readout operations for the remaining figures. A portion of the pixel array 100 is shown in the figure, configured in accordance with the above-noted panchromatic checkerboard CFA pattern. As in FIG. 2, the particular portion of the array that is shown in FIG. 4 comprises four rows of eight pixels each, although it is to be understood that sampling and readout operations for the remaining portions of the array are carried out in a similar manner. The pixel array is assumed to be configured in the 4T4S arrangement described in conjunction with FIG. 2, and its associated sampling and readout circuitry is assumed to be configured as shown in FIG. 3. The text at the left of the array ("C2") identifies one or more TGs that are being activated in conjunction with the sampling operation for a given 2×2 subarray of shared pixels. The "TG Arrangement" diagram on the left side of the figure shows the relationship between TGs and pixels in the 2×2 subarray, with TGs denoted C1 and C2 representing two pixels of the same color and TGs denoted P0 and P3 representing two panchromatic pixels.

Vertical arrows coming out of the pixel array 100 show the sampling operations into either the top column circuits or the bottom column circuits. Note that the sampling arrows reflect the fact that there is only one pixel output line for every two columns, but each pixel output line can be sampled by top and bottom column circuits. The text at the left of the vertical arrows ("Sample Even" or "Sample Odd") indicates which column circuits are being affected by the sampling operation.

Top and bottom column circuits 110T and 110B are shown by the rectangles at the top and bottom, respectively, of the pixel array 100. The nomenclature in the rectangles indicates T or B for top or bottom and includes a number for readout address. Rightward pointing arrows coming out of the column circuits indicate which column circuits are being read out. The column circuits are read in sequence. The text at the left of the rightward pointing arrows ("Read Odd" or "Read Even") indicates which column circuit addresses are to be read, where, as noted above, the addresses are denoted by the numbers in the column circuit rectangles.

The term "line" is used to refer to a readout unit, that is, a set of pixels that are read out in a given readout operation. Thus, "Line 0" as shown in FIG. 4 represents a readout unit given by the sequence B0, T1, B2, and T3. In this figure, only odd addresses are being read out of the top column circuits 110T while only even addresses are being read out of the bottom column circuits 110B. Also, it should be noted that Line 0 provides readout of half as many pixels (4 in this case) as are contained in a given row in the array (8 in this case). Although concurrent sampling and readout operations are shown in this figure, such an arrangement is not a requirement of the invention.

Figure 5A:
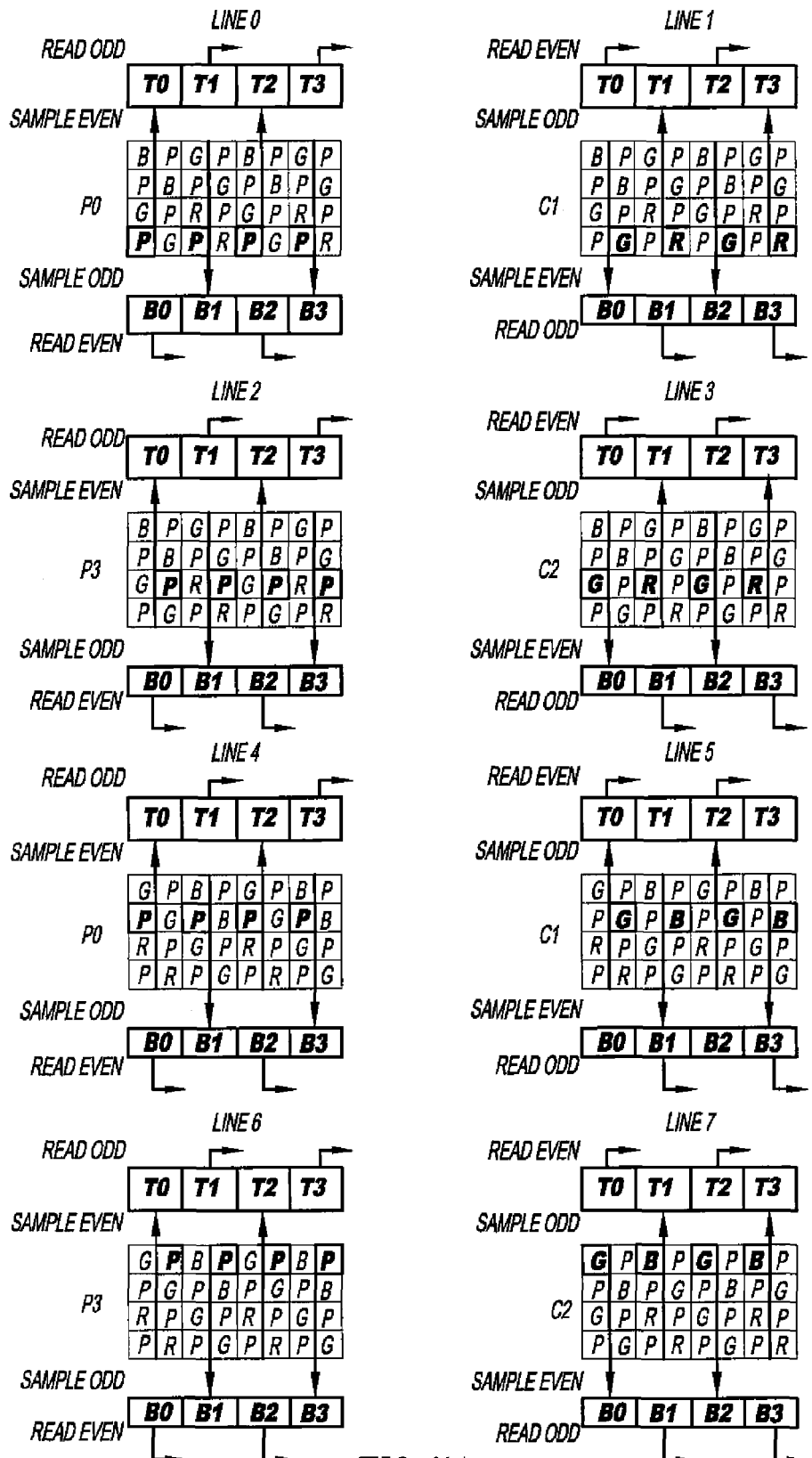
Figure 5B:
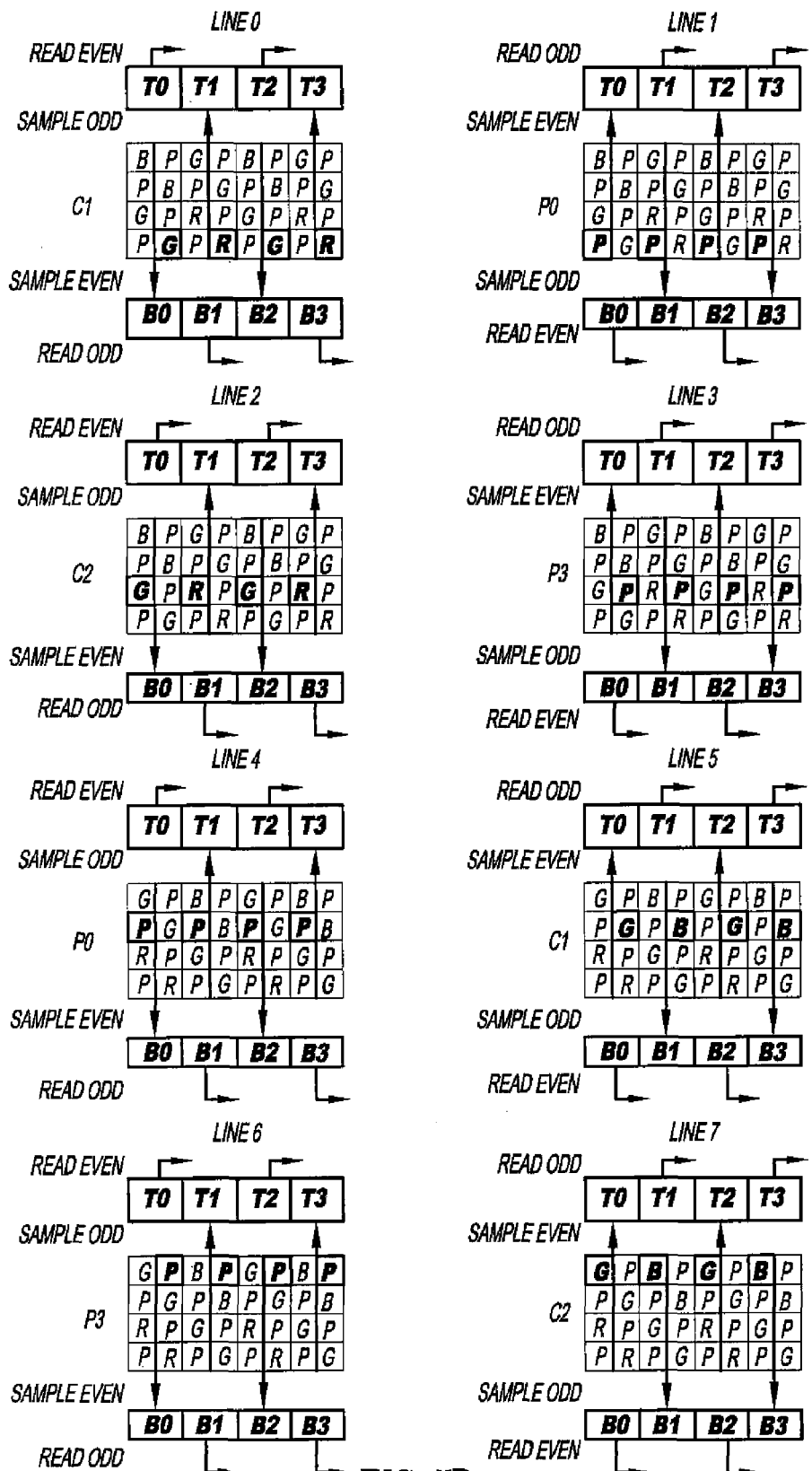

FIGS. 5A and 5B show two different sequences of lines, denoted Option 1 and Option 2, for sampling and readout of the four-row portion of the pixel array 100 at full resolution and without binning of colors. It is apparent that eight lines, denoted Line 0 through Line 7, are required to read out the four rows in each of the two different options.

Figure 6A:
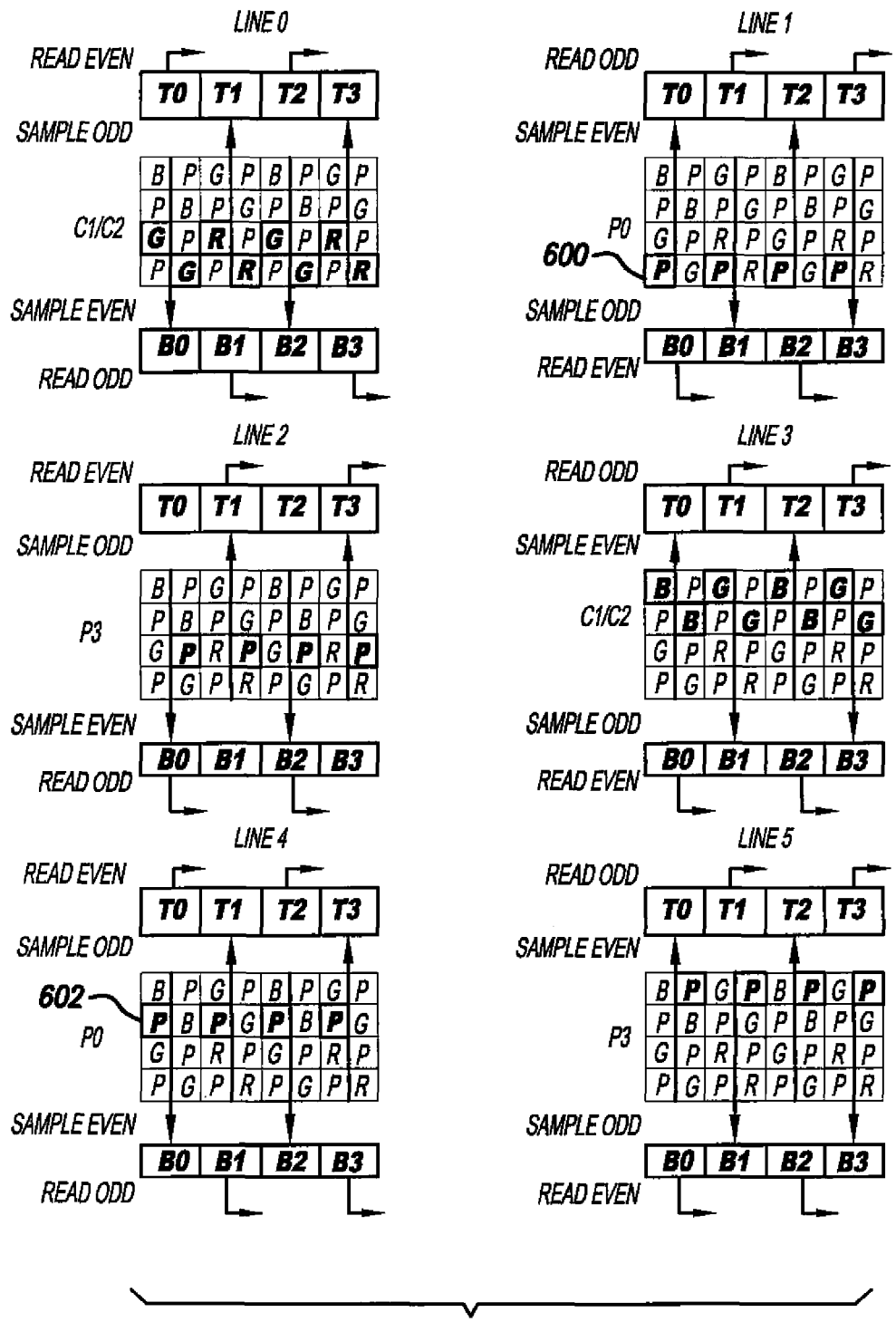
Figure 6B:
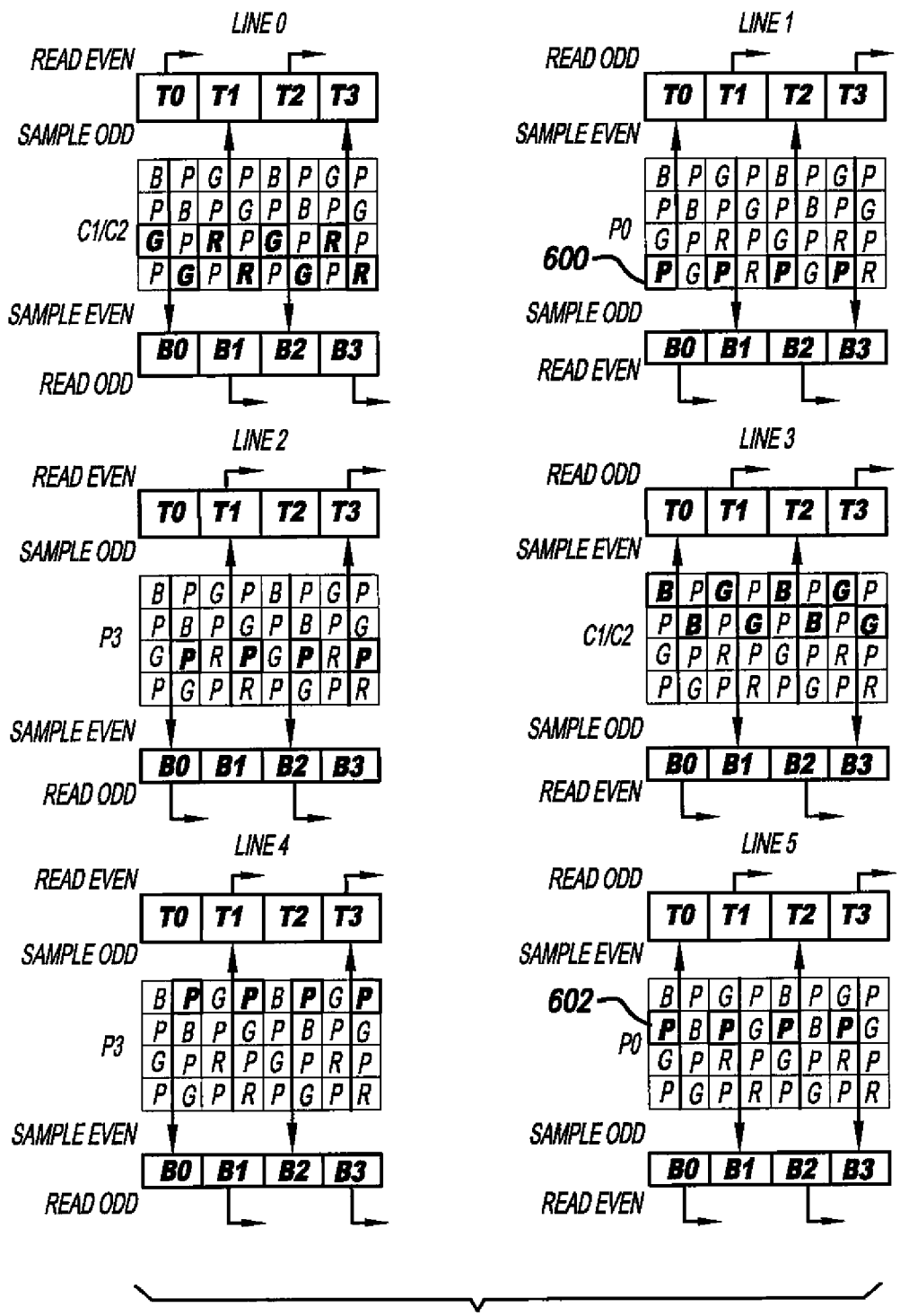

FIGS. 6A and 6B show two different sequences of lines, again denoted Option 1 and Option 2, for sampling and readout of the four-row portion of the pixel array 100 at full resolution with binning of colors to improve signal-to-noise ratio (SNR) and to improve frame rate. Note that six lines are required to read out the four rows in this example.

In both of the FIG. 6 options, the first four lines are the same. However, in Option 2, the sampling and readout order for the panchromatic pixels in lines 4 and 5 is the opposite of that used in Option 1. This second option ensures that the panchromatic pixels in the same relative positions in each 2×2 pixel cell are read using the same output channel, regardless of whether a given such panchromatic pixel is from the blue/green row pair or the green/red row pair. For example, with reference to FIG. 6A, it can be seen that output channel T0 is used in Line 1 to read out a lower left panchromatic pixel 600 in one of the 2×2 pixel cells, while output channel B0 is used in Line 4 to read out a lower left panchromatic pixel 602 in another 2×2 pixel cell. Thus, in FIG. 6A, panchromatic pixels in the same relative position in different 2×2 pixel cells are read out using different column circuits. The FIG. 6B sampling and readout arrangement addresses this issue. For example, it can be seen from this figure that lower left panchromatic pixels 600 and 602 are now both read out using column circuit T0, in Line 1 and Line 5, respectively. Such an arrangement may be preferred in embodiments in which there are differences between the top and bottom column circuits that would otherwise require gain correction or another type of adjustment.

Figure 7:
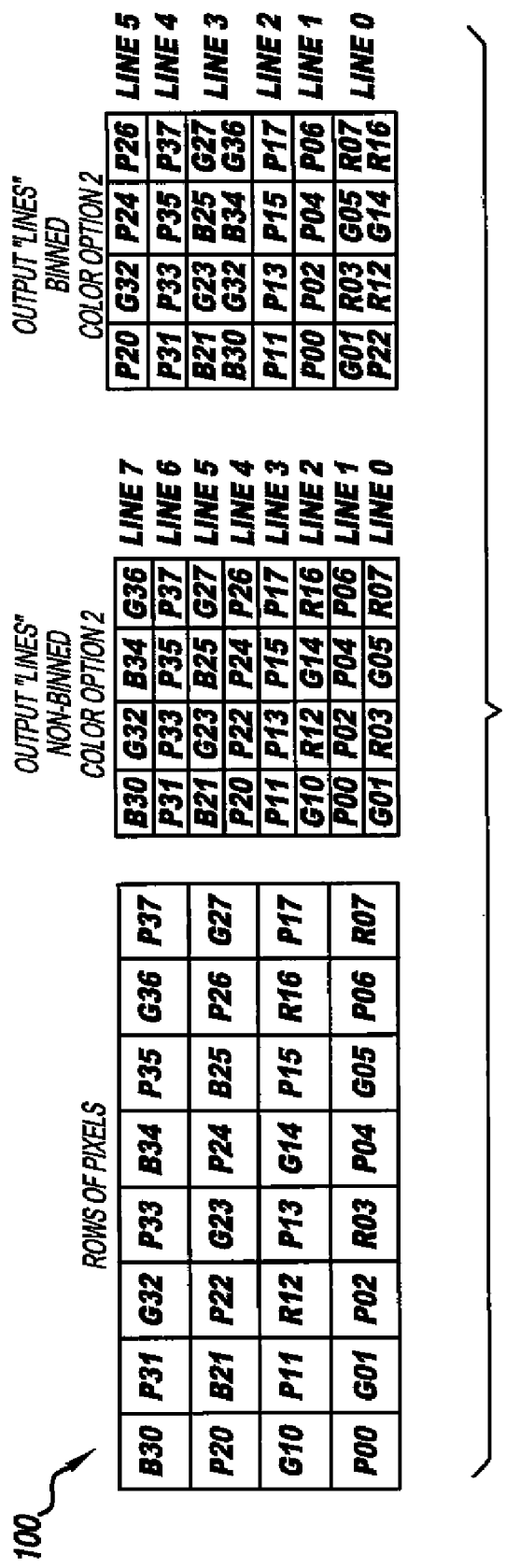

FIG. 7 shows the relationship between the rows of pixels in the four-row portion of the pixel array 100 (left diagram) and the output lines that are read out of the array for full resolution readout using both non-binned color pixels (middle diagram) and binned color pixels (right diagram). The middle and right diagrams correspond respectively to the diagrams "Full Resolution Non-Binned Color (Option 2)" in FIG. 5B and "Full Resolution Binned Color (Option 2)" in FIG. 6B. Readout is from bottom to top in the four-row portion of the array, with the pixels being denoted by their color R, B, G or P followed by a number ij in which the first digit i denotes the row (i=0, 1, 2 or 3) and the second digit j denotes the column (j= 0, 1, 2, . . . 7).

As mentioned previously, the term "line" is used to refer to a readout unit. It is apparent from FIG. 7 that two lines are required to read out one full resolution row when using non-binned color (middle diagram), with one line comprising all the color pixels from the row and the other line comprising all the panchromatic pixels from the row. Similarly, three lines are required to read out two full resolution rows when using binned color (right diagram), with one line comprising the binned color pixels from the two rows, one line comprising all the panchromatic pixels from one row, and the remaining line comprising all the panchromatic pixels from the other row.

Figure 8:
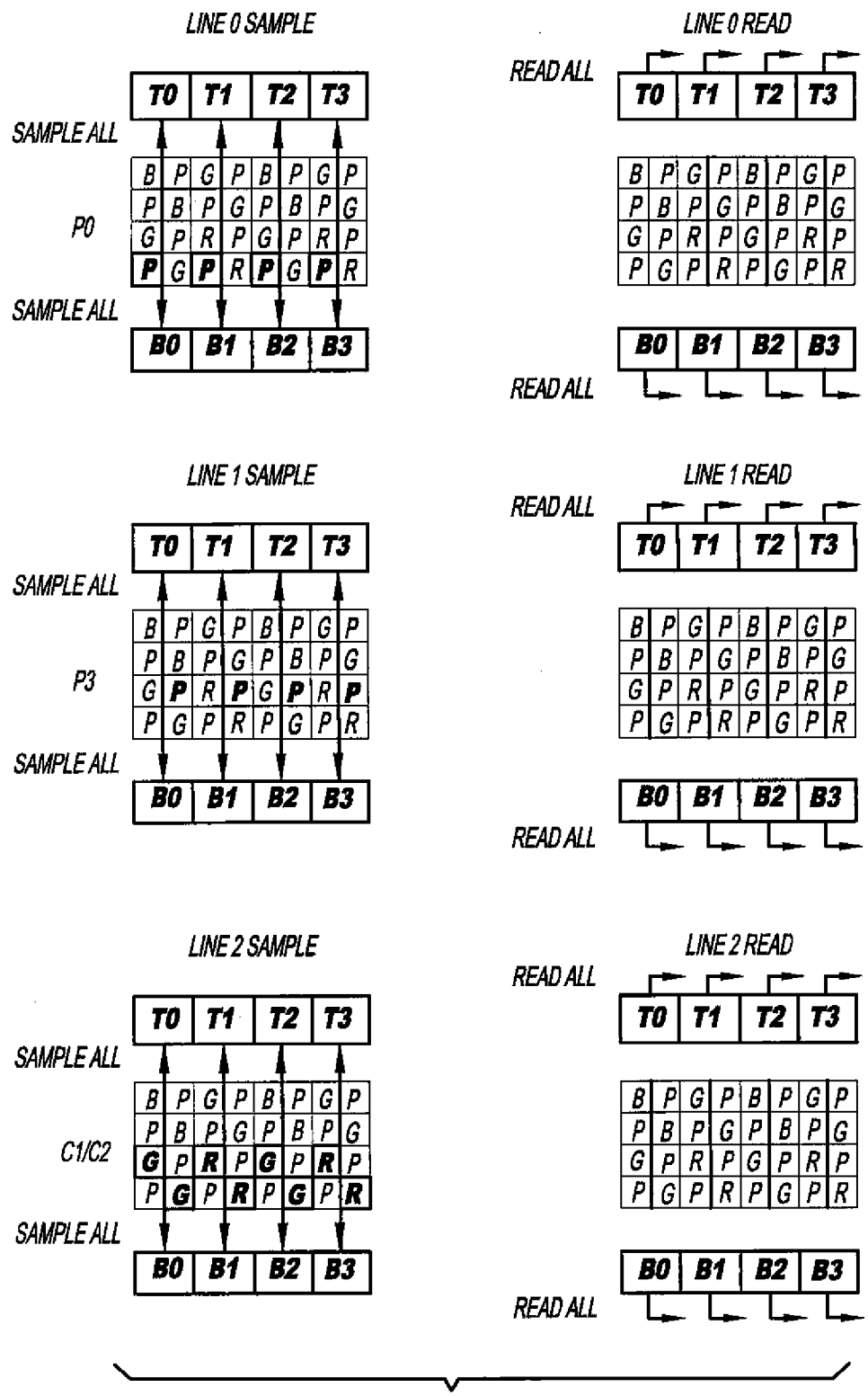

With reference now to FIG. 8, a sequence of lines is shown for sampling and readout of the four-row portion of the pixel array 100 at full resolution with binning of colors and double sampling. This exemplary oversampling arrangement provides further SNR improvement at the cost of reduced frame rate. Although the figure shows the sampling and readout for only the green/red row pair (i.e., the lower two rows of the four-row portion of the array), it is to be understood that the green/blue row pair (i.e., the upper two rows of the four-row portion of the array) is read out identically to the red/green row pair. Also, sampling and readout are non-concurrent in this example, that is, occur at separate times.

Figure 9A:
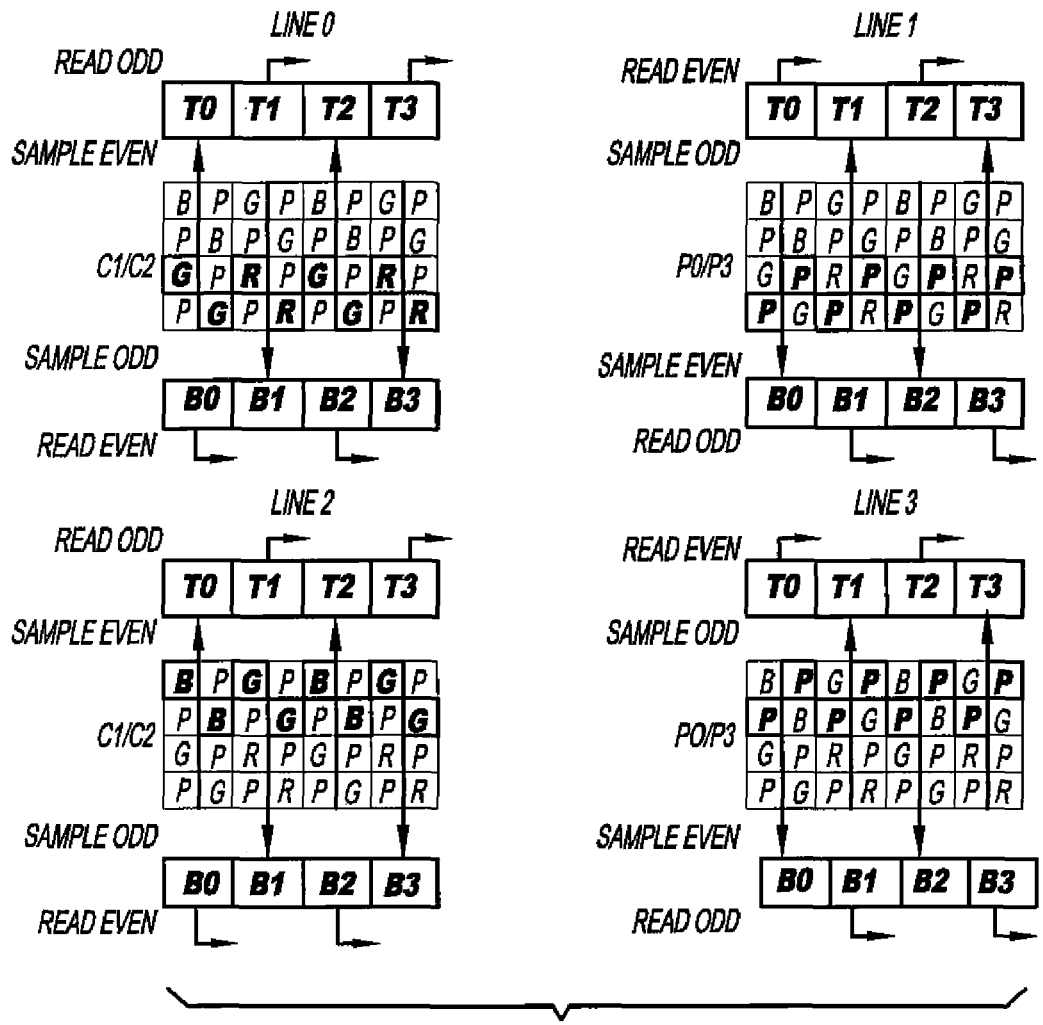
Figure 9B:
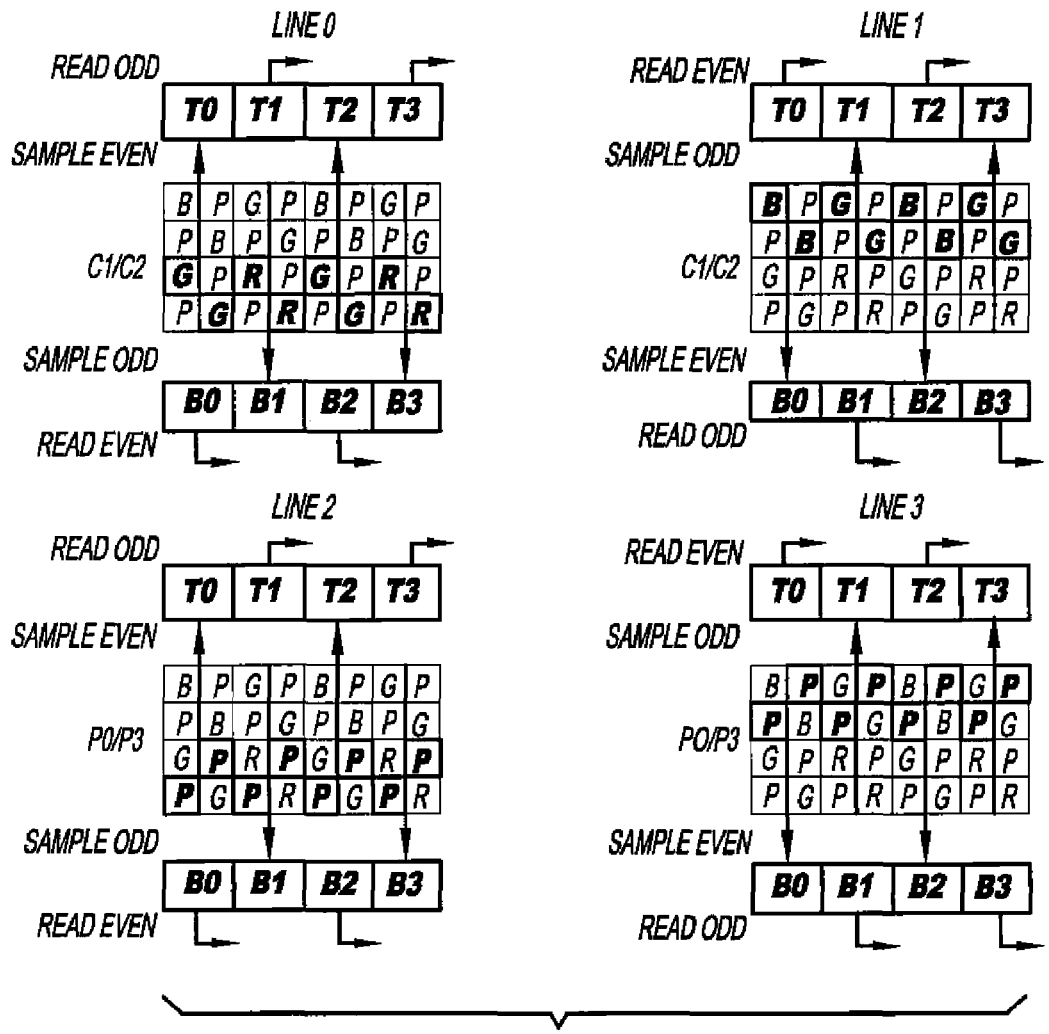

FIGS. 9A and 9B show two different sequences of lines, denoted Option 1 and Option 2, for sampling and readout of the four-row portion of the pixel array 100 at one-quarter resolution and with separate binning of the colors and panchromatic pixels to improve SNR and to improve frame rate. Four lines, denoted Line 0 through Line 3, are required to read out the four rows in each of the two different options. In Option 1 as shown in FIG. 9A, green pixels are read out using both top and bottom column circuits. As previously indicated, this type of situation may be undesirable in implementations in which there are differences between the top and bottom column circuits. The sampling and readout arrangement shown in FIG. 9B addresses this issue by ensuring that all green pixels are read out using column circuits on one side of the array, namely, the top column circuits in this example. This eliminates any differences in the green response that would otherwise be attributable to the green pixel pairs being read out of column circuits on both top and bottom of the array.

Figure 10:
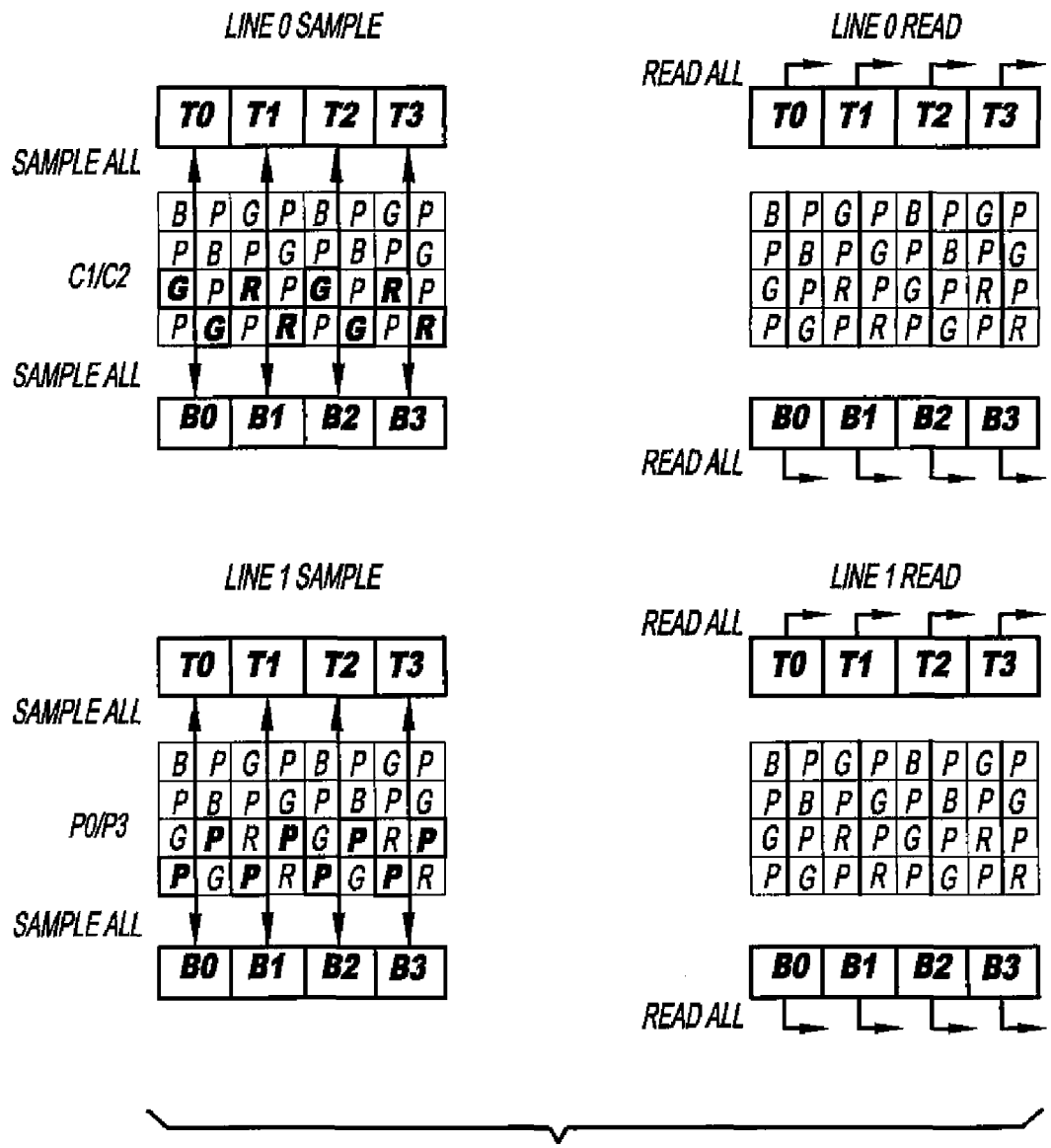

FIG. 10 shows a sequence of lines for sampling and readout of the four-row portion of the pixel array 100 at one-quarter resolution, with separate binning of the colors and panchromatic pixels, and with double sampling to provide further SNR improvement at the cost of reduced frame rate. As in the FIG. 8 example, the sampling and readout in FIG. 10 is shown for only the green/red row pair, but it is to be understood that the green/blue row pair is read out identically to the red/green row pair. Also, sampling and readout are again non-concurrent in this example.

Figure 11:
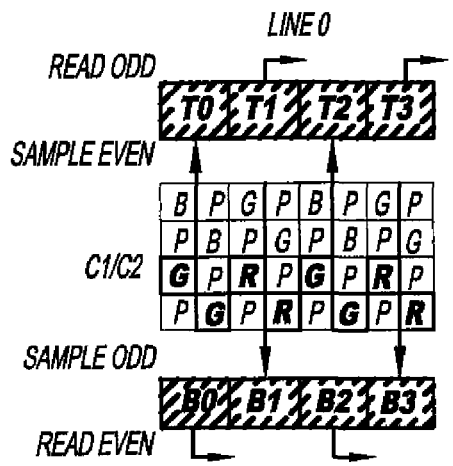
Figure 11:
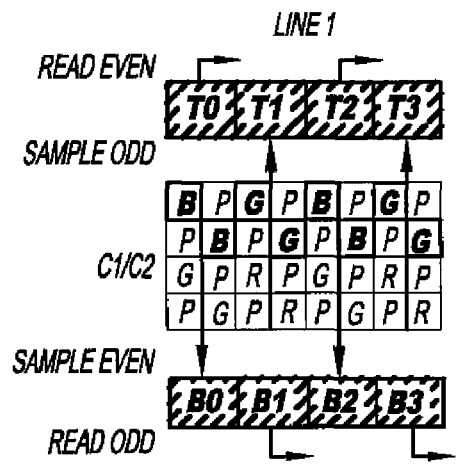
Figure 11:
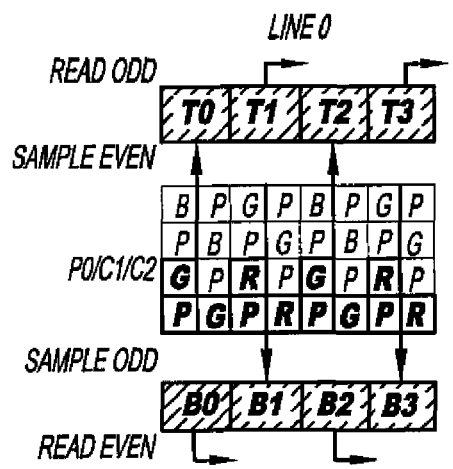
Figure 11:
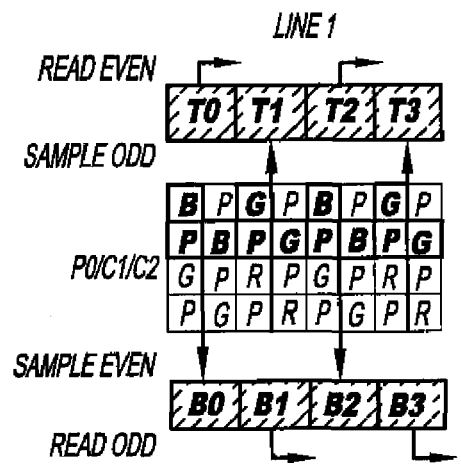
Figure 11:
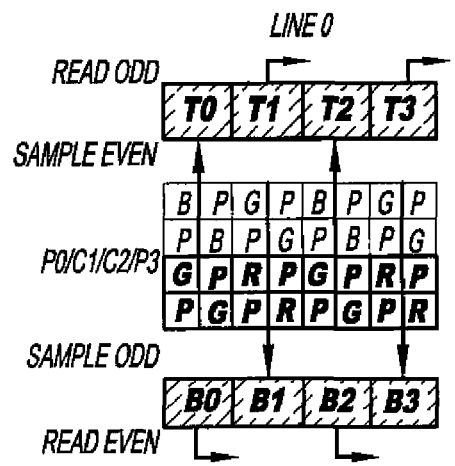
Figure 11:
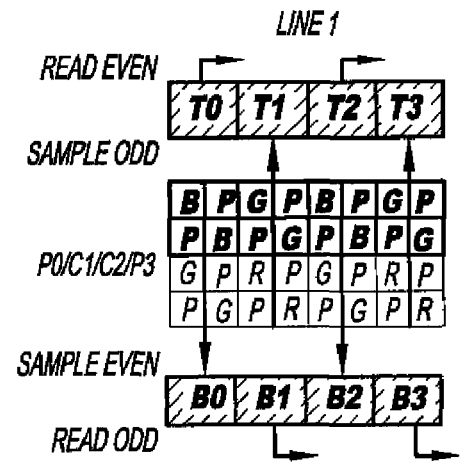

FIG. 11 shows three different line sequences for quarter-resolution video sampling and readout of the four-row portion of pixel array 100. All of these sequences provide output consistent with that which would be provided if a Bayer CFA pattern were used. The differences between the three sequences relate to how many panchromatic pixels are included with the color pixels in the binned result. Including panchromatic pixels with the color pixels increases photographic speed but decreases color saturation. The top diagram in FIG. 11 shows the color only case, the middle diagram shows a medium desaturation case using one panchromatic pixel for each pair of same-color pixels, and the bottom diagram shows a higher desaturation case using two panchromatic pixels for each pair of same-color pixels.

Figure 12:
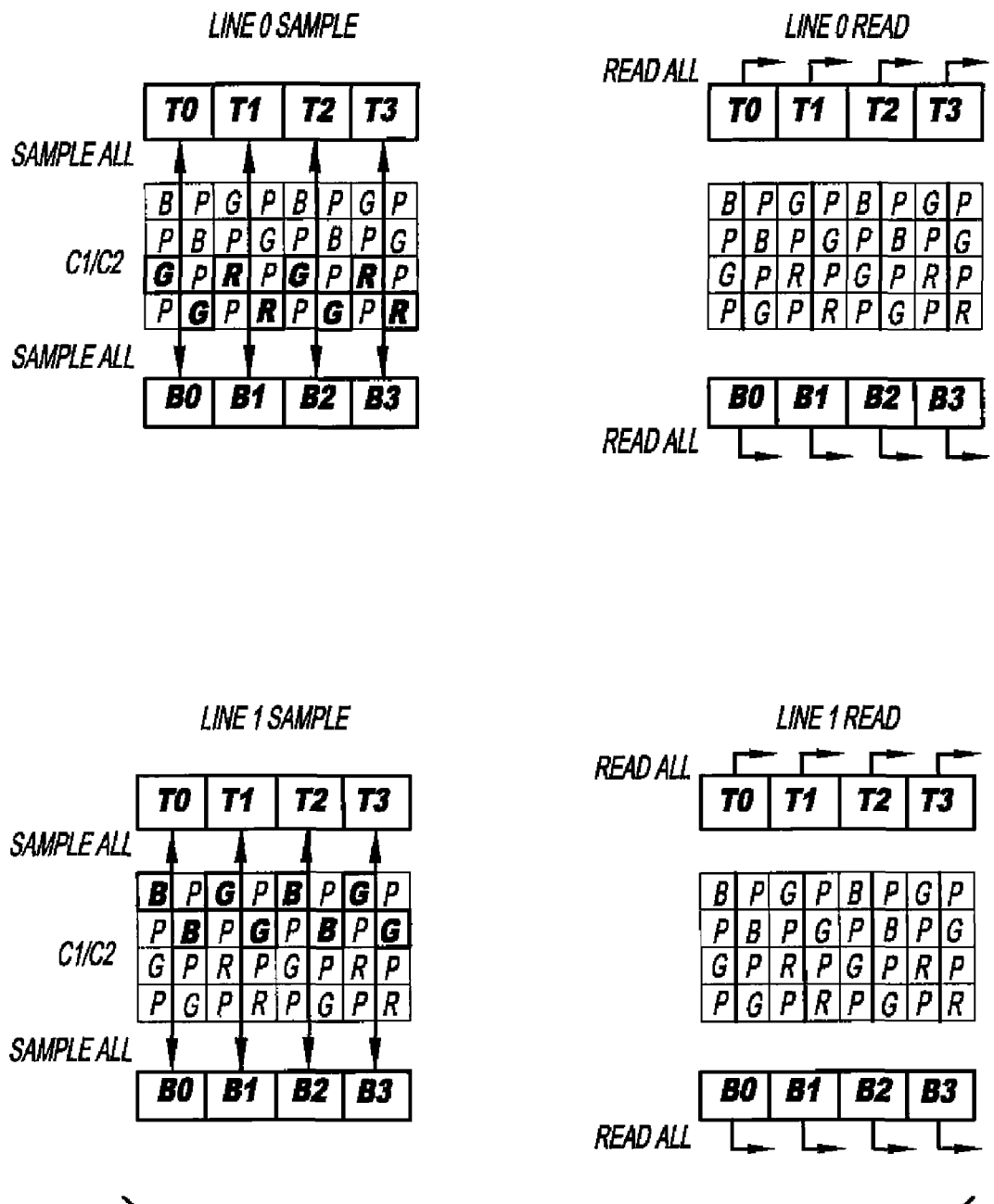

Turning now to FIG. 12, another sequence of lines is shown for quarter-resolution video sampling and readout of the four-row portion of pixel array 100. In this sequence, double sampling is used to provide SNR improvement at the cost of reduced frame rate. Similar sequences can be used for desaturated video in which one or two panchromatic pixels are binned with each pair of same-color pixels, as in the FIG. 11 examples.

Figure 13:
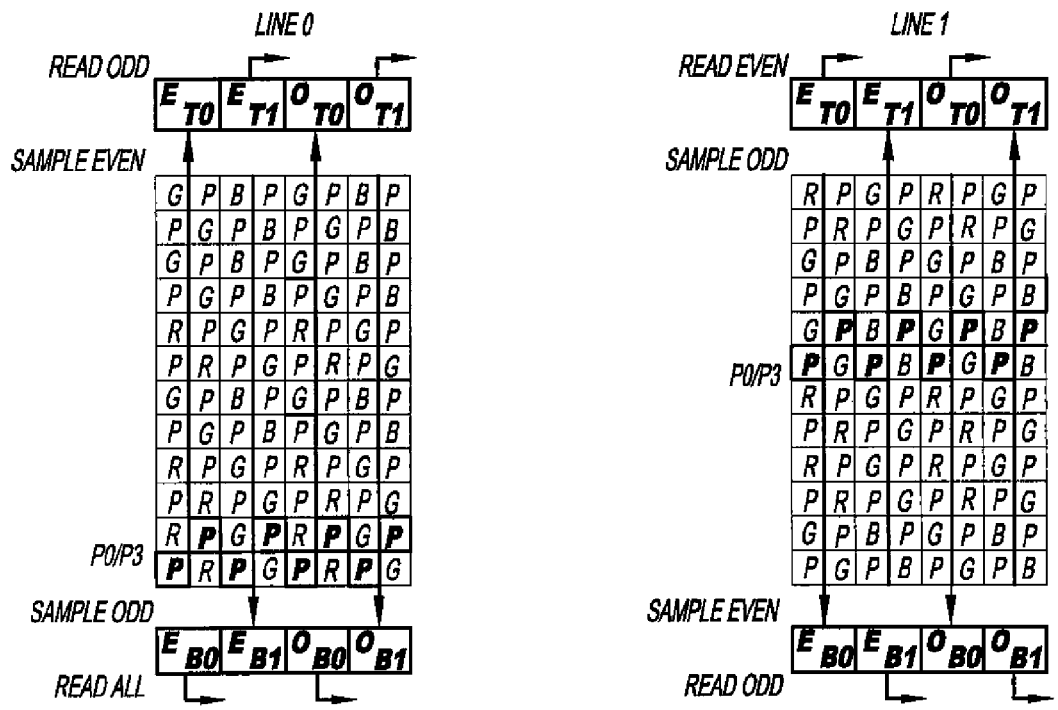
Figure 13:
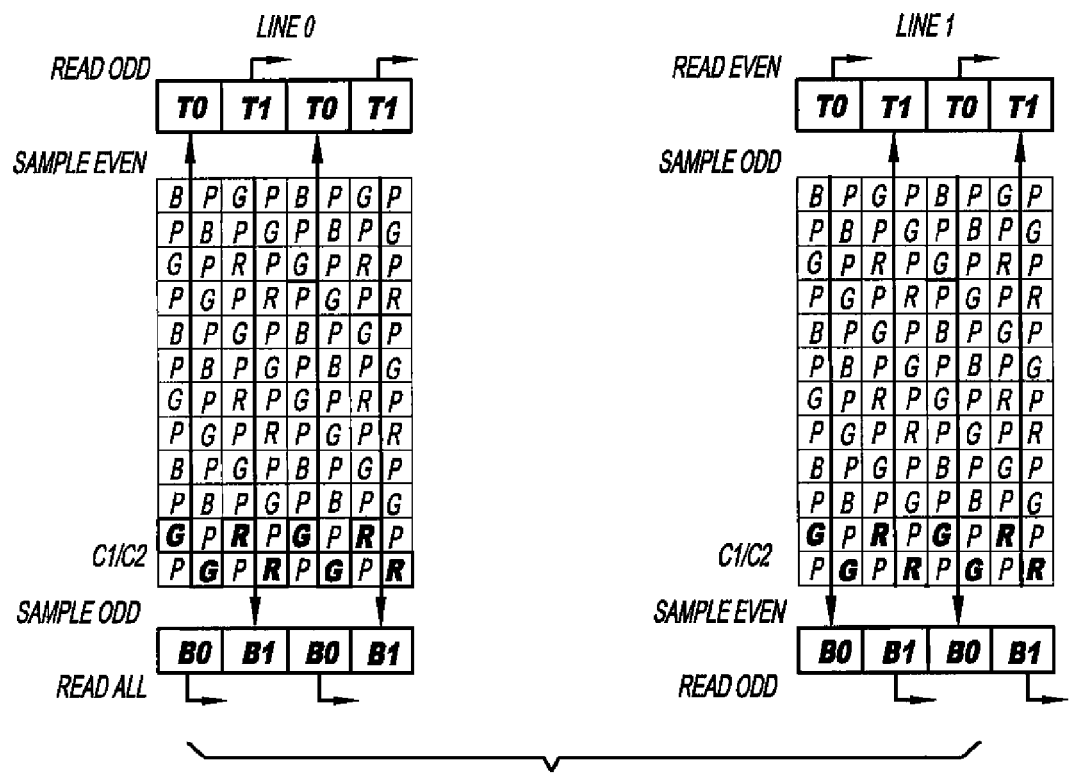

FIG. 13 shows two different sequences of lines for sampling and readout of the four-row portion of the pixel array 100 that are particularly useful in fast autofocus applications. The upper diagram shows an arrangement with binning of panchromatic pixels, while the lower diagram shows an arrangement with binning of color pixels and output consistent with a Bayer CFA pattern. In both cases, there is aggressive vertical subsampling (i.e., taking 1 out of every 3 row pairs) that reduces the amount of data to read and increases the frame rate. The relatively high horizontal sampling frequency in both cases allows good determination of focus. The panchromatic case will have the best photographic sensitivity, an important consideration given that the high frame rate will limit the exposure time. The Bayer output case will allow the data to be used for both preview and video purposes as well as for determination of focus.

The sampling and readout arrangements of the illustrative embodiments advantageously allow the color pixels from a given row pair to be read out separately from the panchromatic pixels. The exemplary 2×2 pixel arrangement of FIG. 2 in which two columns of pixels share a common output means that two sampling operations are required to access all the pixels from a given row. With a sparse CFA pattern, such as the panchromatic checkerboard pattern used in the illustrative embodiments above, improved performance is obtained by reading out the color pixels separately from the panchromatic pixels so as to avoid having to separate them later in memory. Furthermore, the above-described techniques allow the sampling of half a row of pixels (e.g., either the panchromatic pixels or the color pixels) concurrently with the reading out of a previously sampled half row of pixels, effectively eliminating the overhead of the sampling time. Another advantage is that the described techniques allow a pair of same-color pixels or a pair of panchromatic pixels to be combined in the charge domain prior to readout, thereby improving SNR and reducing readout time. For example, certain of the techniques require only three sampling and readout operations for each row pair, two for the panchromatic pixels and one for the binned color pixels.

The illustrative embodiments make it clear that the sampling and readout techniques described herein are highly flexible, and provide improved performance in a wide variety of applications, including operating modes involving double sampling (i.e., oversampling to improve SNR at the expense of readout time), video and autofocus. These and other additional operating modes may be made selectable in a given image capture device depending on capture conditions, end user preference or other factors.

The invention has been described in detail with particular reference to certain illustrative embodiments thereof, but it will be understood that variations and modifications can be effected within the scope of the invention as set forth in the appended claims. For example, the particular configuration of an image capture device, including its image sensor and associated sampling and readout circuitry, can be varied in alternative embodiments. Also, features such as the particular types of CFA patterns that are used, the configuration of the pixel array and the column circuits, and the line sequences of the sampling and readout operations, may be altered in other embodiments to accommodate the needs of other image capture devices and operating modes. These and other alternative embodiments will be readily apparent to those skilled in the art.

PART LIST 10 light from subject scene
11 imaging stage
12 lens
13 neutral density filter
14 iris
18 shutter
20 image sensor
22 analog signal processor
24 analog to digital (A/D) converter
26 timing generator
28 image sensor stage
30 digital signal processor (DSP) bus
32 digital signal processor (DSP) memory
36 digital signal processor (DSP)
38 processing stage
40 exposure controller
42 brightness sensor
50 system controller
52 bus
54 program memory
56 system memory
57 host interface
60 memory card interface
62 memory card socket
64 memory card
65 image display
68 user control and status interface
70 viewfinder display
72 exposure display
74 user inputs
76 status display
80 video encoder
82 display controller
100 pixel array
102 pixel
104 photodiode
106 transfer gate (TG)
108 additional circuitry
110 column circuits
110T top column circuits
110B bottom column circuits
112 sample-and-hold switches
114 column circuit capacitors
116 column output switches
600 lower-left panchromatic pixel
602 lower-left panchromatic pixel

The invention claimed is:

1. An image sensor comprising:
an array of pixels arranged in rows and columns, the columns being separated into groups each comprising a plurality of the columns and sharing a common output;
sampling and readout circuitry comprising, for each group of columns in the pixel array, a corresponding plurality of column circuits, the sampling and readout circuitry being configured to sample the common output for each group of columns independently into one of the plurality of column circuits associated with said group, and to read out the common output for each group of columns as previously sampled into another of the plurality of column circuits associated with said group; and
a sparse color filter array pattern disposed over the array of pixels, wherein the sparse color filter array pattern includes a minimal repeating unit including sixteen pixels arranged in four four-pixel cells as follows:

$$\begin{array}{cccc} Z & P & Y & P \\ P & Z & P & Y \\ Y & P & X & P \\ P & Y & P & X \end{array}$$

wherein P represents panchromatic pixels and X, Y and Z represent respective color pixels.

2. The image sensor of claim 1 wherein said image sensor comprises a CMOS image sensor.

3. The image sensor of claim 1 wherein the plurality of column circuits for each group comprises a first column circuit arranged on a first side of the pixel array and a second column circuit arranged on a second side of the pixel array.

4. The image sensor of claim 1 wherein the plurality of column circuits for each group comprises first and second column circuits both arranged on one side of the pixel array.

5. The image sensor of claim 1 wherein the sampling and readout circuitry is configured to sample the common output for a given one of the groups of columns into one of the plurality of column circuits associated with the given group concurrently with reading out of the common output for the given group as previously sampled into another of the plurality of column circuits associated with the given group.

6. The image sensor of claim 1 wherein said pixel array is configured to provide controllable connection of one or more of the pixels in a given one of the groups of columns to the corresponding shared common output.

7. The image sensor of claim 1 wherein X, Y and Z are individually selected from red, green and blue.

8. The image sensor of claim 7 wherein X, Y and Z are red, green and blue, respectively.

9. The image sensor of claim 1 wherein X, Y and Z are individually selected from cyan, magenta and yellow.

10. The image sensor of claim 9 wherein X, Y and Z are cyan, magenta and yellow, respectively.

11. The image sensor of claim 1 wherein said sampling and readout circuitry is configured such that the color pixels in a given one of said cells are sampled and read out using different column circuits than the panchromatic pixels in the given cell.

12. The image sensor of claim 1 wherein said sampling and readout circuitry is configured such that panchromatic pixels in a given one of said rows are sampled into particular ones of the column circuits concurrently with color pixels in said row being read out from other ones of the column circuits.

13. The image sensor of claim 1 wherein same-color pixels in a given one of the cells are sampled together into the same column circuit associated with the group of columns that includes those same-color pixels.

14. The image sensor of claim 1 wherein said sampling and readout circuitry is configurable into a plurality of operating modes including one or more of the following:
- a full resolution mode without binning of same-color pixels;
- a full resolution mode with binning of same-color pixels;
- a full resolution mode with binning of same-color pixels and double sampling;
- a quarter-resolution mode with binning of panchromatic and same-color pixels;
- a quarter-resolution mode with binning of panchromatic and same-color pixels and double sampling;
- a quarter-resolution video mode without desaturation;
- a quarter-resolution video mode with desaturation;
- a quarter-resolution video mode with double sampling;
- a fast autofocus mode with binning of panchromatic pixels; and
- a fast autofocus mode with binning of color pixels.

15. A digital imaging device comprising:
an image sensor; and
one or more processing elements configured to process outputs of the image sensor to generate a digital image;
wherein said image sensor comprises:
an array of pixels arranged in rows and columns, the columns being separated into groups each comprising a plurality of the columns and sharing a common output;
sampling and readout circuitry comprising, for each group of columns in the pixel array, a corresponding plurality of column circuits, the sampling and readout circuitry being configured to sample the common output for each group of columns independently into one of the plurality of column circuits associated with said group, and to read out the common output for each group of columns as previously sampled into another of the plurality of column circuits associated with said group; and
a sparse color filter array pattern disposed over the array of pixels, wherein the sparse color filter array pattern includes a minimal repeating unit including sixteen pixels arranged in four four-pixel cells as follows:

$$\begin{matrix} Z & P & Y & P \\ P & Z & P & Y \\ Y & P & X & P \\ P & Y & P & X \end{matrix}$$

wherein P represents panchromatic pixels and X, Y and Z represent respective color pixels.

16. The digital imaging device of claim 15 wherein said digital imaging device comprises a digital camera.

* * * * *